April 15, 1930.  T. K. STEVENSON  1,754,489
SCREW THREAD CHASER
Filed Sept. 15, 1926
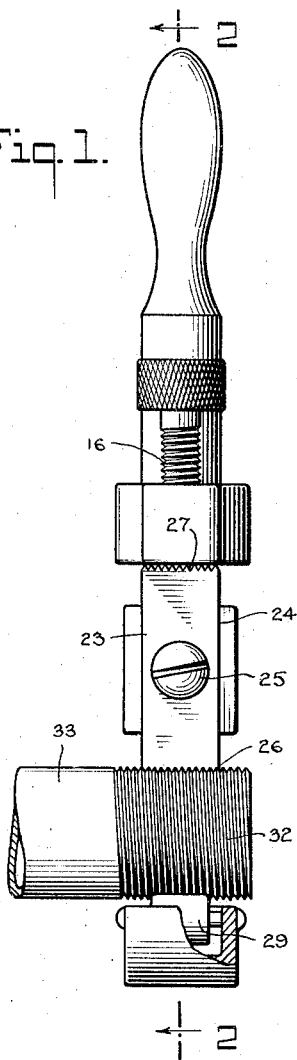
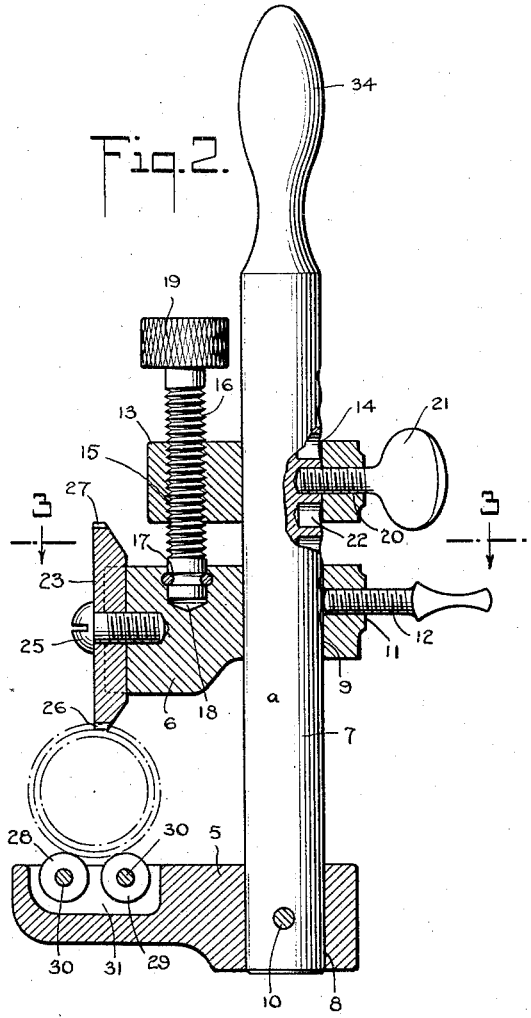
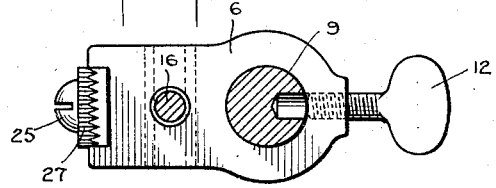
INVENTOR
Thomas K Stevenson
BY
Cavanagh & James
ATTORNEYS Patented Apr. 15, 1930

1,754,489

UNITED STATES PATENT OFFICE

THOMAS K. STEVENSON, OF NEW YORK, N. Y., ASSIGNOR TO FRANCIS VAN BLARCOM, OF NEW YORK, N. Y.

SCREW-THREAD CHASER

Application filed September 15, 1926. Serial No. 135,530.

The present invention relates to hand tools adapted for use in connection with the operation of making repairs to damaged screw threads.

According to the present invention the screw thread to be repaired is clamped between a pair of oppositely disposed jaws arranged upon a support, the support being adapted for manual operation to rotate the jaw members on the damaged thread as an axis.

An object of the invention is to provide a means for effectively engaging a thread chaser with a screw thread so that accidental disengagement between the parts is prevented without hindrance to turning movement of the chaser upon the thread.

Another object is to provide for effecting easy and expeditious adjustment of the thread engaging portions of a thread chaser to any of the various diameters of screw threads used in relatively small machinery such as motor vehicles.

The above and other objects are accomplished by instrumentalities pointed out in the following specification.

The invention is clearly defined in the claim.

A satisfactory embodiment of the invention is illustrated in the accompanying drawings forming part of the specification and in which Fig. 1 is a plan view of the invention in use, a portion thereof being broken away to disclose the construction and relation of other parts, Fig. 2 is a longitudinal section taken approximately on the line 2—2 of Fig. 1 and looking in the direction of the arrows, Fig. 3 is a detail cross section on the line 3—3 of Fig. 2 with the stationary jaw omitted.

The oblong jaw members 5 and 6 are disposed one opposite the other and are carried by the support a, the shank portion 7 of which extends through transverse recesses 8 and 9 in an end portion of the jaws. Jaw 5 is stationary and fixedly secured to an end portion of shank 7 as by a transversely disposed pin 10, and jaw 6 is slidable upon shank 7 so that the width of the intervening space between the jaws may be varied as desired. A screw threaded opening 11 in the connected end portion of jaw 6 extends into the recess 9 and accommodates a set screw 12, which is turnable into binding contact with shank 7 for the purpose of securing jaw 6 in any of its adjustable positions. Sliding jaw 6 is disposed between stationary jaw 5 and a block 13, which is also made to slide upon shank 7, as by having one end thereof transversely recessed for shank 7 as indicated by 14. An open ended screw threaded opening 15 in the outer end of block 13 is disposed parallel with the long axis of shank 7 and accommodates an adjusting screw 16. One end of the adjusting screw 16 is swivelled as at 17 in a socket 18, in the adjacent face of sliding jaw 6, and the opposite end of the screw is provided with a knob 19, which when turned manually operates the screw 16 to slide jaw 6 upon shank 7. When jaw 6 is moved by means of screw 16 block 13 is positively held against movement longitudinally of shank 7. In this connection the recessed end portion of block 13 is provided with a screw threaded opening 20 which communicates with the recess 14, and is adapted for accommodating a set screw 21. The set screw 21 is adapted to enter any of a series of sockets 22 in shank 7, and cooperates with the screws 16, and 12, to prevent accidental movement or displacement of jaw 6, from any of its adjusted positions.

A screw thread shaper 23 is disposed in a transverse recess 24 in the outer end of jaw 6 and removably secured therein by a machine screw 25. The shaper is disposed parallel with shank 7, and the end portion of the shaper adjacent to jaw 5 overhangs jaw 6 and is provided with a straight row of teeth 26. The teeth 26 are constructed to interfit or mesh with a screw thread; and are spaced in accordance with the pitch of the thread. Referring to Fig. 1 it is to be noted that the end of the shaper remote from jaw 5 is also provided with a row of teeth 27. The teeth 27 are broader and spaced apart for greater distances than teeth 26.

The teeth 26—27 of the shaper are in alignment with a space between bearing rolls 28—29 disposed transversely of jaw 5. The shafts 30 of the said rolls are extended through the side walls of a recess 31 formed in the inner face of jaw 5.

When a screw threaded end portion 32 of a tube or other object 33 is interposed between the jaw members 5—6 and engaged thereby as shown the rolls 28—29 bear upon spaced portions of the curved threaded surface and on one side of the object, and the opposite side of the object is engaged by the teeth 26 at a point substantially midway between the rolls 28—29 so that the object is securely held between the jaws 5 and 6.

The end portion of shank 7 remote from jaw 5 is provided with a handle 34 to aid in manipulating the device to turn upon the screw threaded portion 32 as an axis, when the said portion 32 is engaged as shown in Fig. 1.

In use the jaws 5—6 are separated so as to receive between them a threaded surface wherein sections of the thread are damaged. The damage may take the form of a bent thread or one that is crossed or crushed. When screws 12—21 are turned away from contact with shank 7 jaw 6 and block 13 may be moved as a unit longitudinally of the shank. This gives an approximate adjustment of jaw 6 with respect to the adjacent surface of the object between the jaws, after which screw 21 is caused to enter one of the sockets 22 nearest thereto. When screw 16 is turned in one direction jaw 6 moves until teeth 26 engage the threaded surface 22 after which set screw 12 is turned into binding contact with shank 7. The screws 12 and 16 now operate by virtue of their arrangement at right angles to each other to securely hold the jaw 6 against any displacement, so that when the device is rotated upon portion 32 of the intervening object as an axis teeth 26 follow the thread of portion 32 and operate to restore the damaged sections of the thread to their original positions.

It is to be noted that the rolls 28—29 make turning of the device upon the portion 32 comparatively easy; and the provision of different sizes of teeth in shaper 23, and the removability of the said shaper enables the device of this invention to be used in connection with any of the various pitches of screw threads found in relatively small machinery such as motor vehicles. It being understood that a set of a plurality of shapers 23 may be supplied with the device and adapted for use with various pitches found in screw threads.

Although I have shown and described a preferred embodiment of my invention it is to be noted that the same is susceptible of various changes and I reserve the right to employ such of these as may come within the scope of the appended claim.

What I claim is:

A screw thread chaser comprising a shank terminating at one end in a handle portion, a stationary jaw member secured to the opposite end of the shank and extending at right angles thereto, aligned spaced roller bearing members carried by the stationary jaw, a sliding jaw member mounted on the shank, a thread shaper detachably connected to the sliding jaw member and having serrated opposite end portions either of which is adapted to mesh simultaneously with successively disposed sections of the thread to be chased, and means for adjustably securing the sliding jaw member at various distances from the stationary jaw member, said means including a block adjustably mounted on the shank, means including a set screw carried by the block and adapted to be selectively seated in spaced sockets in the shank for securing the block in any of its adjusted positions on the shank, an adjusting screw connection between the block and the sliding jaw and disposed at right angles to the block-securing means, and means carried by the sliding jaw and cooperating with the support to secure the sliding jaw in any of its adjusted positions, the last-named means being arranged at right angles to the adjusting screw.

Signed at New York city, in the county of New York and State of New York this 8th day of September, A. D. 1926.

THOMAS K. STEVENSON.